US008937847B2

(12) United States Patent
Ayela et al.

(10) Patent No.: US 8,937,847 B2
(45) Date of Patent: Jan. 20, 2015

(54) SYSTEM FOR ACQUIRING SEISMIC DATA IN A MARINE ENVIRONMENT, USING SEISMIC STREAMERS COUPLED TO MEANS FOR DETECTING AND/OR LOCATING MARINE MAMMALS

(75) Inventors: Gérard Ayela, Ploumoguer (FR); Stéphane Coatelan, Brest (FR)

(73) Assignee: Sercel, Carquefou (FR)

( * ) Notice: Subject to any disclaimer, the term of this patent is extended or adjusted under 35 U.S.C. 154(b) by 444 days.

(21) Appl. No.: 12/415,087

(22) Filed: Mar. 31, 2009

(65) Prior Publication Data
US 2009/0251991 A1 Oct. 8, 2009

(30) Foreign Application Priority Data
Apr. 2, 2008 (FR) ...................................... 08 01814

(51) Int. Cl.
*G01V 1/38* (2006.01)
*G01V 1/20* (2006.01)
(52) U.S. Cl.
CPC *G01V 1/38* (2013.01); *G01V 1/201* (2013.01); *G01V 1/3835* (2013.01)
USPC ......................................................... 367/20
(58) Field of Classification Search
CPC ........ G01V 1/201; G01V 1/38; G01V 1/3835
USPC ............. 367/15–21, 105, 118, 120, 122, 124, 367/130–131, 135, 191, 76, 88, 129, 139, 367/154; 43/9.2, 9.6, 17.1; 119/220; 181/110
See application file for complete search history.

(56) References Cited

U.S. PATENT DOCUMENTS

| 4,408,307 | A | * | 10/1983 | Harris | 367/79 |
| 4,509,151 | A | | 4/1985 | Anderson | |
| 4,992,990 | A | * | 2/1991 | Langeland et al. | 367/19 |
| 5,894,450 | A | * | 4/1999 | Schmidt et al. | 367/134 |
| 6,011,753 | A | * | 1/2000 | Chien | 367/21 |
| 6,170,436 | B1 | * | 1/2001 | Goodson et al. | 119/220 |
| 6,839,302 | B2 | * | 1/2005 | Austad et al. | 367/19 |

(Continued)

FOREIGN PATENT DOCUMENTS

| AU | 2007201855 | 5/2007 |
| EP | 0426511 | 5/1991 |

(Continued)

OTHER PUBLICATIONS

Potter, et al. "Visual and Passive Acoustic Marine Mammal Observations and High-Frequency Seismic Source Characteristics Recorded During a Seismic Survey," IEEE Journal of Oceanic Engineering, vol. 32, No. 2, Apr. 2007, pp. 469-483.*
Optical Fiber Technology table of contents for vol. 1, Oct. 1995 issue, downloaded Feb. 24, 2014 from http://www.sciencedirect.com/science/journal/10685200/1.*

(Continued)

*Primary Examiner* — Daniel L Murphy
(74) *Attorney, Agent, or Firm* — Patent Portfolio Builders PLLC

(57) ABSTRACT

Disclosed herein is a system of acquiring seismic date in a marine environment, which includes: seismic streamers towed by a vessel; and means for detecting and/or locating marine mammals, characterised in that said marine mammal detection and/or location means are secured to said seismic streamers.

20 Claims, 3 Drawing Sheets

(56) References Cited

U.S. PATENT DOCUMENTS

| | | |
|---|---|---|
| 7,376,045 B2 * | 5/2008 | Falkenberg et al. ............ 367/19 |
| 7,495,998 B1 * | 2/2009 | Deligeorges et al. ......... 367/127 |
| 2007/0223307 A1 | 9/2007 | Storteig et al. |
| 2008/0013404 A1 * | 1/2008 | Acker et al. .................... 367/88 |
| 2010/0067326 A1 * | 3/2010 | Iranpour et al. ................ 367/20 |

FOREIGN PATENT DOCUMENTS

| | | |
|---|---|---|
| EP | 0880033 | 11/1998 |
| WO | WO-01/55747 | 8/2001 |

OTHER PUBLICATIONS

French Search Report, dated Nov. 14, 2008 (2 pages).

* cited by examiner

SYSTEM FOR ACQUIRING SEISMIC DATA IN A MARINE ENVIRONMENT, USING SEISMIC STREAMERS COUPLED TO MEANS FOR DETECTING AND/OR LOCATING MARINE MAMMALS

CROSS-REFERENCE TO RELATED APPLICATIONS

This application claims the benefit of French Patent Application No. FR 08/01814 filed on Apr. 2, 2008, which application is hereby incorporated by reference in its entirety.

BACKGROUND OF THE INVENTION

1. Field of the Invention

The field of the invention is that of the acquisition of seismic data. More precisely, the invention relates to equipment for analysing the sea bed. The invention relates in particular to the oil prospecting industry using the seismic method, but can apply to any field using a system for acquiring seismic data in a marine environment.

2. Background of the Invention

The operations of acquiring geophysical data on site conventionally use networks of sensors (designated by the term "hydrophones" with regard to the acquisition of data in a marine environment). The hydrophones mentioned previously are distributed along cables in order to form linear acoustic antennae normally referred to as "streamers" or "seismic streamers". The network of seismic streamers is towed by a seismic boat. A seismic streamer consists of an assembly of individual sections instrumented with seismic sensors and associated analogue to digital conversion electronics. The seismic boat also tows one or more seismic sources consisting of a network of air cannons, water cannons or acoustic vibrators. The pressure wave generated by the seismic source passes through the column of water and insonifies the upper layers of the sea bed. Part of the signal is refracted by the interfaces and inhomogeneities of the ocean crust. The resulting acoustic signals are then detected by the seismic sensors distributed over the entire length of the seismic streamers. These acoustic signals are processed, digitized and retransmitted by the telemetry from the seismic streamers to the operator station situated on the seismic boat, where the processing of the raw data is carried out.

To have a correct image of the mapping of the sea bed in the exploration zone, it is important to precisely locate the seismic sensors distributed along the seismic streamers as well as the seismic source. This location of the streamers is important, in particular in order to:

- follow the position of the hydrophones in order to obtain satisfactory precision in the image of the sea depths;
- detect the movements of the streamers in relation to each other;
- follow the navigation of the streamers, in particular in a situation of passing round an obstacle such as an oil barge.

It should be noted that seismic streamers consist of an assembly of sections generally having a length of approximately 150 meters, the streamers being able to have a total length of several kilometers (6 to 7 kilometers, but possibly ranging up to 10 or even 12 kilometers).

Various methods are used for precisely locating the position of the seismic sensors distributed along the streamers. Initially, the positioning of the marine seismic streamers and seismic source have been based on the use of GPS receivers, distributed at a few particular points (boat, buoys supporting seismic source, buoys at the head and tail of the streamers, etc), and magnetic compasses distributed in larger numbers along the streamers (these compasses making it possible to determine deformations in the streamers). Currently the techniques for positioning marine seismic streamers are more efficient. They still use GPS positioning in order to have the absolute geographical reference frame, but they associate with this the use of submarine acoustics in order to determine the distances between acoustic modules mounted along the seismic streamers. These acoustic modules may be transmitters and/or receivers and make it possible to determine the distances between the adjoining modules situated on the various streamers. There are then available, in order to achieve precise positioning of all the streamers, reference points given by the GPS receivers and a mesh of inter-module and therefore inter-streamer distances.

SUMMARY OF THE INVENTION

The disclosure herein provides a system for acquiring seismic data in a marine environment, which includes:
- seismic streamers towed by a vessel;
- means for detecting and/or locating marine mammals, characterised in that the marine mammal detection and/or location means are secured to the seismic streamers.

In one embodiment, the streamers each include means for transmitting data to a master controller on board the vessel and in that the marine mammal detection and/or location means are intended to communicate with the data transmission means integrated in the seismic streamers in order to transmit data to the master controller.

In another embodiment, the system includes means for detecting positions of the streamers and data transmission means integrated in the seismic streamers intended to transmit the positions to the master controller.

In another embodiment, the marine mammal detection and/or location means are associated with means for processing data issuing from the marine mammal detection and/or location means, the processing means being secured to the streamers.

In another embodiment, the marine mammal detection and/or location means are integrated in self-contained modules clamped to the seismic streamers.

In another embodiment, the seismic streamers include at least one coil allowing inductive coupling of the modules with the data transmission means integrated in the seismic streamers.

In another embodiment, the seismic streamers each include a plurality of sections, the marine mammal detection and/or location means being interposed between two of the sections.

In another embodiment, the marine mammal detection and/or location means include self-contained electrical supply means.

In another embodiment, the seismic streamers include electrical supply means, the marine mammal detection and/or location means being supplied by the seismic streamer electrical supply means.

In another embodiment, the marine mammal detection and/or location means are integrated in modules that include a section including first acoustic reception means dedicated to a marine mammal detection and/or location function and second acoustic reception means dedicated to a function of positioning the streamers in relation to each other, the first and second acoustic reception means being distinct.

In another embodiment, the marine mammal detection and/or location means are integrated in modules that include a section including acoustic reception means common to a marine mammal detection and/or location function and to a function of positioning the seismic streamers in relation to each other.

In another embodiment, the marine mammal detection and/or location means are associated with means for emitting acoustic signals deterring marine mammals.

In another embodiment, the marine mammal detection and/or location means are integrated in modules that include a section including first acoustic emission means dedicated to a function of deterring marine mammals and second acoustic emission means dedicated to a function of positioning the seismic streamers in relation to each other, the first and second acoustic emission means being distinct.

In another embodiment, the marine mammal detection and/or location means are integrated in modules that include a section including acoustic emission means common to a function of deterring marine mammals and a function of positioning the seismic streamers in relation to each other.

In another embodiment, the system includes navigation control means coupled to the streamers in order to act at least on the immersed position of the streamers, the navigation control means being integrated in modules that include the navigation control means.

Another aspect of the invention described herein provides a method of acquiring seismic data in a marine environment implementing a system wherein a master controller on board the vessel dynamically configures each acoustic module constituting the network in order to ensure either the acoustic positioning of the seismic streamers or the detection of marine mammals or an acoustic repellent function.

DESCRIPTION OF THE FIGURES

Other characteristics and advantages of the invention will emerge more clearly from a reading of the following description of several embodiments of the invention, given by way of illustrative and non-limitative example, and the accompanying drawings, among which.

DETAILED DESCRIPTION

Figure 1:
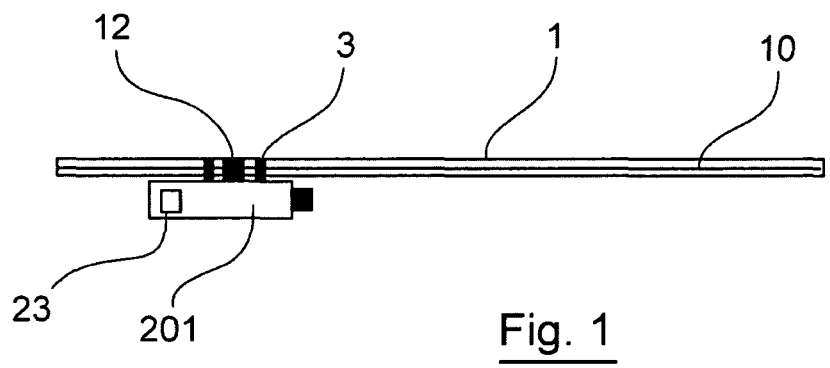
FIG. 1 is a schematic representation of a first embodiment of the invention according to which the marine mammal detection and/or location modules are clamped to the seismic streamers.

One problem relating to oil prospecting by 3D marine seismic survey is the monitoring of marine mammals during the exploration campaign. International regulations in this regard and the recommendations of competent bodies encourage marine seismic operators to carry out, in parallel to their measurement campaign, continuous monitoring for detecting the possible presence of marine mammals in the exploration zone for purposes of protection.

This monitoring is carried out either visually by one or more human operators or using an independent system of acoustic receiver or receivers fulfilling functions of passive detection, classification and geographical location of the marine mammal or mammals.

These acoustic systems, commonly referred to as "PAM" (passive acoustic monitoring), are intended for this use. They consist of acoustic receivers, in general one or more streamers dedicated to this function, associated with a remote processing unit, for example on the seismic vessel. They are self-contained and can or should be deployed in parallel to the seismic streamers.

The equipment often associated with the passive monitoring of marine mammals is the "acoustic deterring" of marine mammals. This equipment emits artificial acoustic signals in order to drive away mammals before the implementation of activities assumed to be dangerous for these species.

Currently, the positioning of the seismic streamers towed by the seismic boat on the one hand, and on the other hand the passive monitoring of marine mammals (PAM) as well as the function of acoustic deterring of the mammals, are independent functionalities.

In other words, the seismic boat tows in particular:
one or more seismic sources;
a network of seismic streamers, over the length of which the seismic sensors are distributed;
transducers, the function of which is to participate in the positioning of the seismic streamers, these transducers being able to be integrated on the streamers;
acoustic modules, the function of which is to participate in the monitoring of mammals;
and possibly acoustic repellents.

It will therefore be understood that the positioning of the seismic streamers and the monitoring of marine mammals are functionally and structurally independent.

The result of this is:
an increase in the complexity of all the means towed by the seismic boat, giving rise to consequent work in terms of logistics (storage, deployment, redeployment, management of positions with a view to preventing collisions, etc);
an increase in complexity at the system level with the management of various systems for positioning the seismic streamers, monitoring marine mammals and deterring marine mammals;
high costs because of the increase in the means used.

The objective of the invention is in particular to mitigate these drawbacks of the prior art.

More precisely, the objective of the invention is to propose a system for acquiring seismic data in a marine environment making it possible to more effectively integrate in the towed network the functions and means relating to the monitoring of marine mammals.

Another objective of the invention is to provide such a system that also makes it possible to more effectively integrate the function of deterring (distancing) marine mammals.

Another objective of the invention is to provide such a system that makes it possible to optimize the size of the means deployed and towed by the seismic boat.

Another objective of the objection is to provide such a system that makes it possible to reduce the logistic resources relating in particular to the storage and deployment/redeployment of the means contributing to the positioning of the seismic boat and the monitoring of marine mammals.

Yet another objective of the invention is to provide such a system that makes it possible to envisage a reduction in investment associated with the means contributing to the positioning of the seismic streamers and the monitoring of marine mammals.

An additional objective of the operation is to have a high-level system management that integrates the various functionalities (positioning of seismic streamers; detection, classification and location of marine mammals; and deterring of marine mammals) in order to offer seismic operators an integrated and ergonomic management system.

These objectives, as well as others that will emerge hereinafter, are achieved by virtue of the invention, the object of which is a system of acquiring seismic data in a marine environment, comprising:

seismic streamers towed by a vessel;

means for detecting and/or locating marine mammals, characterized in that said means for detecting and/or locating marine mammals are secured to said seismic streamers.

Thus, by virtue of the invention, the distribution, in the towed network, of the functions (and corresponding structural means) relating to the monitoring of marine mammals is optimised.

This is because the invention affords optimization of the size of the means deployed and towed by the seismic vessel.

According to one advantageous solution, said streamers each include means for transmitting data to a master controller on board said vessel, said means for detecting and/or locating marine mammals being intended to communicate with said data transmission means integrated in said seismic streamers in order to transmit data to said master controller.

Preferentially, the system comprises means for detecting positions of said streamers and in that said data transmission means integrated in said seismic streamers are intended to transmit said positions to said master controller.

In this way, the means for transmitting integrated data to the seismic streamers are, according to the invention, taken advantage of to transmit to the master controller the data supplied by:

the streamer position detection means;

the means for detecting and/or locating marine mammals.

The invention therefore provides a system having a level of integration superior to that of prior systems, since the data transmission means integrated in the seismic streamers are common to the streamer position detection means and to the marine mammal detection and/or location means.

It should be noted that the components for detecting and/or locating marine mammals may be the same (in this case the hydrophones) as those that provide the acquisition of seismic data.

In addition, such a solution makes it possible to envisage a reduction in investment, some components being common to the streamer position detection means and to the marine mammal detection and/or location means, while they were duplicated in the systems of the prior art.

According to one advantageous solution, said marine mammal detection and/or location means are associated with means for processing data issuing from said marine mammal detection and/or location means, said processing means being secured to said streamers.

In this way, the data supplied by said detection and/or location means are processed locally, which avoids transmitting raw data to the master controller on board the vessel and consequently avoids using some of the resources (processing and/or computing capacities) of the master controller.

According to a first embodiment, said marine mammal detection and/or location means are integrated in self-contained modules clamped to said seismic streamers.

The modules are then mechanically coupled to the seismic streamers, at a point on the seismic streamer intended for this mechanical coupling.

In this case, said seismic streamers include at least one coil allowing inductive coupling of said modules with said data transmission means integrated in said seismic streamers.

In this way a wireless link is implemented between the module and the streamers with regard to the transmission of PAM data intended for the master controller.

According to a second embodiment, said seismic streamers each comprise a plurality of sections, said marine mammal detection and/or location means being interposed between two of said sections.

In such a configuration, a relatively high level of integration is obtained since, in addition to the data transmission means common to the streamer position detection means and the marine mammal detection and/or location means, the modules including the marine mammal detection and/or location means are included in the length of the seismic streamers and no longer independent of these.

Such a configuration therefore proves to be particularly advantageous with regard to:

the optimization of the size of the means deployed and towed by the seismic vessel;

the operation of the PAM system since there is no longer any need to manage the periodic renewal of the module energy unit;

the logistic savings able to be obtained, with regard to the storage, deployment/redeployment of all the means making up the towed network, and the management of the positions of the various components of this network.

This is because, with regard to the management of the positions of the various components of this network, the management of the positions of the seismic streamers takes place so as to be merged with that of the positions of the modules including the marine mammal detection and/or location means.

According to a variant embodiment, said marine mammal detection and/or location means comprise self-contained electrical supply means.

According to another variant embodiment said seismic streamers include electrical supply means, said marine mammal detection and/or location means being supplied by said electrical supplies of said streamers.

It will be understood that this second variant embodiment reduces the operating costs of the system by eliminating the constraint of the management of self-contained energy systems (periodic battery changes).

According to a first approach of the invention, said marine mammal detection and/or location means are integrated in modules comprising a section including first acoustic reception means dedicated to a marine mammal detection and/or location function and second acoustic reception means dedicated to a function of positioning said streamers in relation to each other, said first and second acoustic reception means being distinct.

According to a second approach of the invention, said marine mammal detection and/or location means are integrated in modules comprising a section including acoustic reception means common to a marine mammal detection and/or location function and to a function or positioning said seismic streamers in relation to each other.

It will be understood that this second approach helps to further increase the level of integration of the marine mammal detection and/or location means and the means for positioning the seismic streamers in relation to each other.

According to another characteristic of the invention, said marine mammal detection and/or location means are associated with means for emitting acoustic signals deterring marine mammals.

In this case, according to a first embodiment, said marine mammal detection and/or location means are integrated in modules comprising a section integrating first acoustic emission means dedicated to a function of deterring marine mammals and second acoustic emission means dedicated to a function of positioning said seismic streamers in relation to each other, said first and second acoustic emission means being distinct.

According to a second embodiment, said marine mammal detection and/or location means are integrated in modules comprising a section including acoustic emission means dedicated to a function of deterring marine mammals and to a function of positioning said seismic streamers in relation to each other.

Once again, this second embodiment helps to further increase the level of integration of the various components.

According to an advantageous variant, the system comprises navigation control means coupled to said streamers in order to act at least on the position of said streamers with respect to immersion (depth), said navigation control means being integrated in modules comprising said navigation control means.

According to this configuration, the following are merged in the same assembly:
the acoustic positioning functionalities of the seismic streamers;
the marine mammal monitoring functionalities (PAM);
and optionally the dynamic streamer control functionalities (the part usually referred to as the "Bird".

The invention also concerns a method of acquiring seismic data in a marine environment using a system as described above, characterized in that a master controller on board said vessel dynamically configures each acoustic module constituting the network in order to provide either the acoustic positioning of the seismic streamers, or the detection of marine mammals, or an acoustic deterring function.

As indicated previously, the principle of the invention lies in proposing a seismic data acquisition system in which data transmission means integrated in the seismic streamers are common to the transmission of data issuing from streamer position detection means and those issuing from marine mammal detection and/or location means, the latter being integrated in modules coupled to the seismic streamers.

FIG. 1 procures a schematic representation of a first embodiment of the invention.

According to this embodiment, the modules 2 are clamped to the seismic streamers 1 by means for clamps 3. Thus the modules 2 extend alongside the seismic streamers, substantially parallel to the corresponding portion of the streamers.

The clamping means are of the type currently used for clamping the acoustic positioning modules or the speed measurement modules or the compass modules or the immersion measurement modules, modules known to persons skilled in the art.

According to the present embodiment, the modules 2 each comprise:
a body 201 that contains the energy, the electronics and the inductive coupling system;
reception acoustics composed of a hydrophone moulded onto the body 201.

Figure 2:
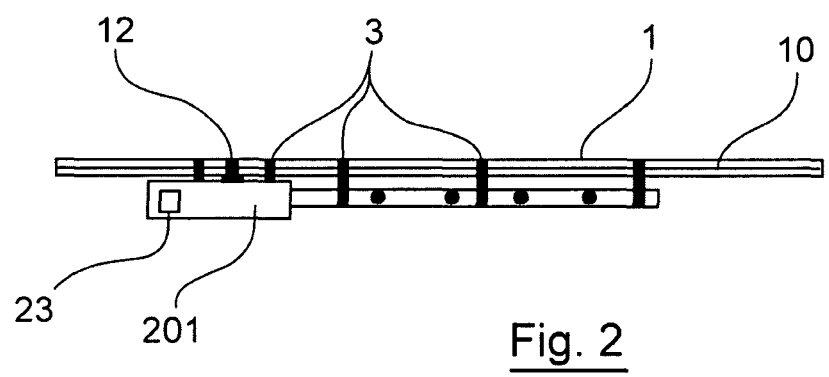
FIGS. 2 and 3 are each a schematic representation of a variant of the first embodiment illustrated by FIG. 1.

FIG. 2 illustrates a variant embodiment of this first embodiment. According to this variant, the modules 2 each comprise:
a section 202 integrating the acoustic reception means 21 (in this case a group of hydrophones);
a body 201 integrating means for processing and transmitting acoustic signals supplied by the acoustic reception means 21.

Moreover, in a system such as the one illustrated by FIG. 1 or the one illustrated by FIG. 2, it will be noted that:
the dialogue between the module 2 and the corresponding streamer is effected by inductive coupling with a coil 12 integrated in the seismic streamers. The transmission of the data is effected by a twisted pair of so-called modem wires 10, conventionally passing through the streamers and connecting the coils 12 in order to transmit supplied data to the master controller;
self-contained electrical supply means 23 are integrated in the module 2 and supply the energy necessary for the functioning of the processing and transmission means integrated in the body 201, as well as to the acoustic reception means 21.

The originality of the configuration described by FIGS. 1 and 2 lies in using the seismic streamers equipped with coils as a functional support for the PAM function. This affords several advantages:
great latitude of positioning of the PAM function;
great ease of implementation;
real-time dialogue through the "coil" pair of wires connecting the inductive coupling coils of the seismic streamer.

Figure 4:
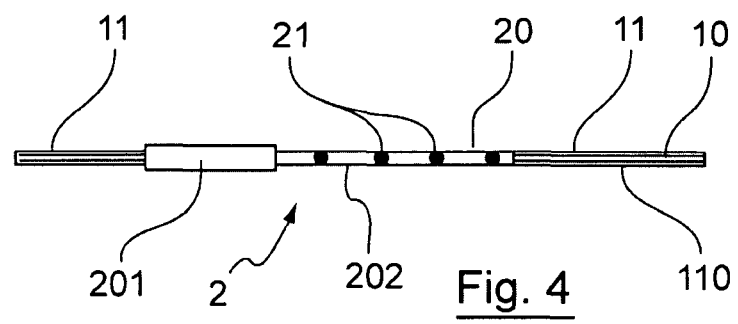
FIG. 4 is a schematic representation of a second embodiment of the invention according to which the marine mammal detection and/or location means are integrated in the length of the seismic streamers.

FIG. 4 illustrates schematically a second embodiment of the invention.

According to this embodiment, the modules 2 are integrated in line with the seismic streamers, along the length of these.

To do this, the seismic streamers being composed of a plurality of sections 11, the modules 2 are interposed between two of these sections 11.

In this case, the module 2 may be either self-contained in terms of energy, or supplied from an electrical supply line 110 integrated in the seismic streamers.

The dialogue between the module 2 and the streamer 1 is effected either by the "modem" pair of wires 10, or be another pair of wires running through the streamer (such as for example the pair of telemetry wires).

A more integrated configuration consists of integrating in the same module the acoustic positioning functionalities of the seismic streamers and the marine mammal monitoring functionalities.

Figure 5:
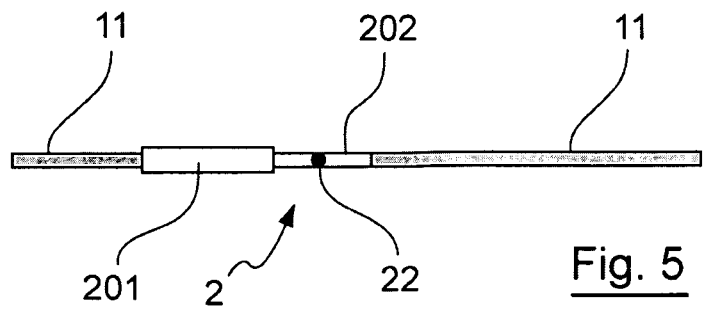
FIGS. 5 to 8 are each a schematic representation of a variant of the second embodiment illustrated by FIG. 4.

Such a configuration is shown schematically by FIG. 5.

According to this configuration, the module is integrated between two sections 11 of a seismic streamer 1. The module 2 consists of a metal body 201 (or made from other material) and a mini-section 202 integrating acoustic means 22, consisting of a transducer that, according to this configuration, may:
either fulfil the function of acoustic positioning of the seismic streamers; in this case the acoustic transducer 22 is used in transmission/reception mode;
or fulfil the function of acoustic receiver for the monitoring of marine mammals; in this case, the acoustic transducer 22 is used in reception mode only.

The dialogue between the module 2 and the corresponding seismic streamer 1, as far as the master controller on board the seismic boat, is implemented by the pairs of telemetry wires integrated in the seismic streamers.

The electrical supply to the modules 2 is effected from supply lines 110 integrated in the seismic streamers 1.

Another variant of the second embodiment consists of integrating several distinct acoustic elements in the mini section 202 of the module 2, namely:
a transducer 22 intended for the positioning of the seismic streamers;
a set of hydrophones 21 intended for the marine mammal monitoring function.

Figure 6:
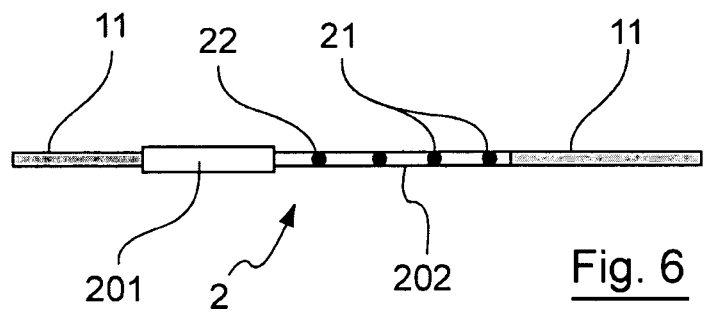

This variant is illustrated by FIG. 6.

In the context of the invention, it is also possible to integrate in the module 2 the function of "acoustic repellent", in addition to the functions of acoustic positioning of the marine seismic streamers and passive monitoring of marine mammals.

The module 2 then has a triple functionality:
- the acoustic positioning of the marine seismic streamers by means for the transducers 22;
- passive monitoring of marine mammals using acoustic receivers 21;
- the function of acoustic repellent of marine mammals, using acoustic emitters 24.

It should be noted that the acoustic emission of the artificial signals necessary for the acoustic repellent function can be achieved either by the transducer used for the acoustic positioning of the seismic streamers or by a transducer dedicated to this function of acoustic repellent.

Figure 3:
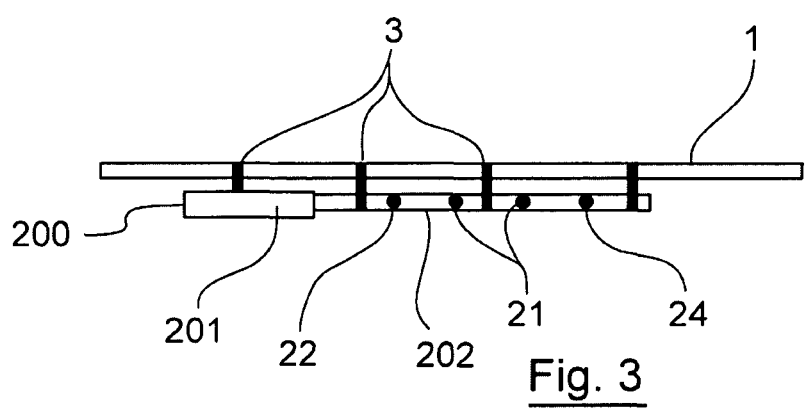
Figure 7:
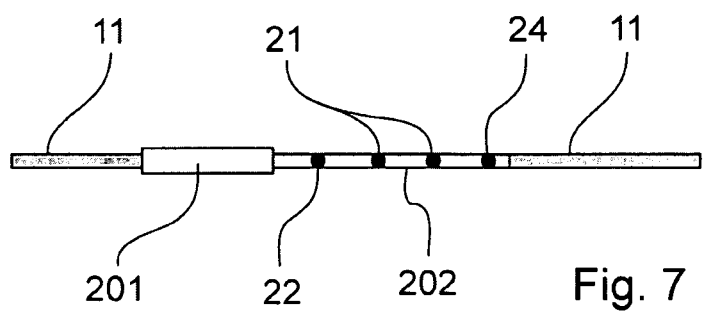

In the same way as for the previous configurations, such a triple-functionality module 2 could be either clamped to the seismic streamer (FIG. 3) or interposed between two sections 11 of the seismic streamer 1 (FIG. 7).

Figure 8:
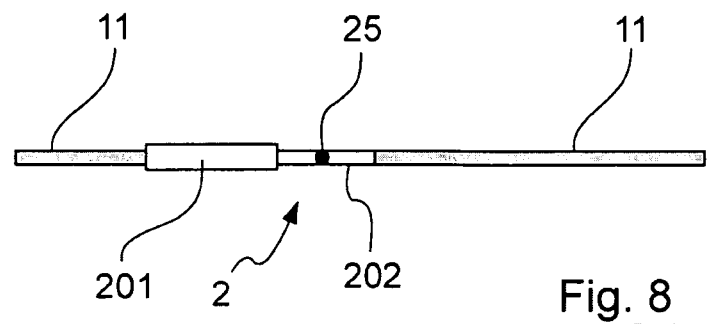

FIG. 8 shows an even more integrated configuration of the system according to the invention, with a "triple function" module 2.

In this configuration, a single acoustic transducer 25 fulfils the three acoustic functions, namely:
- transmission/reception of the acoustic signals intended for the positioning of the seismic streamers;
- reception of the acoustic signals emitted by marine mammals;
- emission of acoustic signals used as a repellent for marine mammals.

Figure 9:
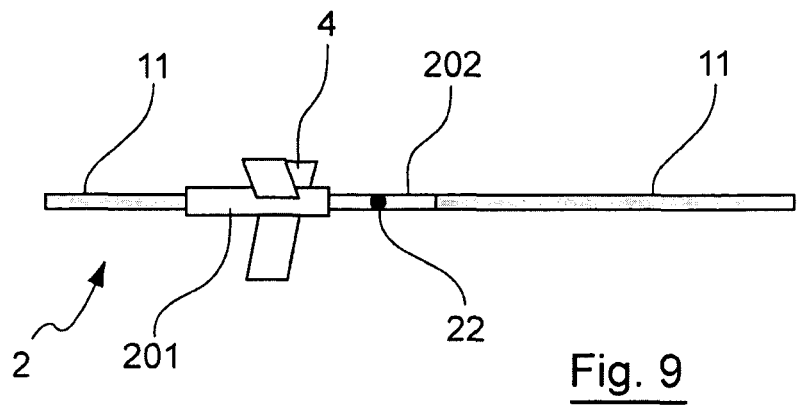
FIGS. 9 to 11 are each a schematic representation of a variant of the second embodiment illustrated by FIG. 4, including navigation control means integrated in the marine mammal detection and/or location modules.

The configuration depicted by FIG. 9 is a version of the system according to the invention integrating navigation control means (conventionally referred to by the term "Bird") intended to act on the depth of the streamer and possibly on the lateral position of the streamers.

In this case, the module 2 includes, in addition to the previous versions, the functionality of dynamic control of the seismic streamer. In this case it fulfils a triple functionality:
- the acoustic positioning of the seismic streamers by means for example of an acoustic transducer 22;
- dynamic control (navigation) of the streamer;
- passive acoustic monitoring of marine mammals.

Figure 10:
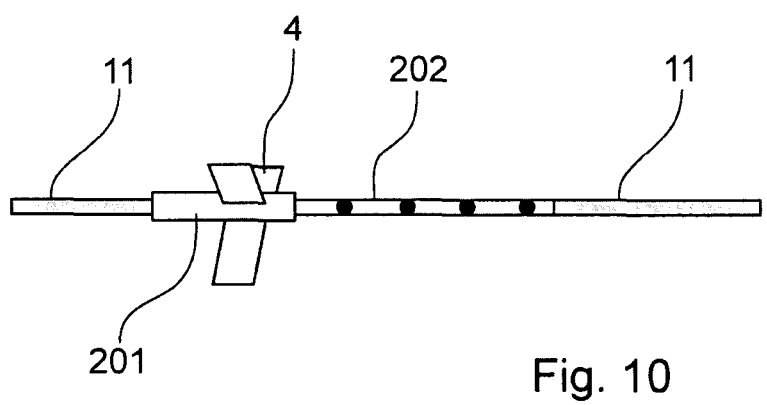

Another variant of the system illustrated by FIG. 9 is shown schematically by FIG. 10.

According to this variant, the mini-section 202 of module 2 includes several acoustic elements, namely:
- a transducer 22 intended for the positioning of the seismic streamers;
- a set of hydrophones 21 intended for the PAM function;
- and possibly a transducer intended for the acoustic repellent function.

The modules of the systems illustrated by FIGS. 9 and 10, which provide the merging of the acoustic positioning and marine mammal monitoring functionalities with optionally dynamic control of the streamers and acoustic repellent are distributed along the marine seismic streamers and allow a more or less dense geographical meshing, according to the number of modules deployed, of the whole of the streamer network.

The supervision system situated on board the vessel can communicate, through the telemetry box of the seismic streamers, with all the modules deployed in the network of streamers.

The information concerning the propagation times for the acoustic paths between the modules distributed along the streamers (the functionality used for the positioning of the seismic streamers) as well as the data of the PAM function and possibly the data for managing the birds and controlling the acoustic repellents go back to the supervision station, where the processing operations of the highest level will be performed.

With regard to the system aspect, the merging of the "hardware" functions of positioning the seismic streamers, marine mammal monitoring and possibly dynamic control of the streamers extends to the merging of the supervision software for these functions. In other words, a single supervision software package provides the navigation (positioning and dynamic control) of the complete network of seismic streamers and includes the functionalities intended for monitoring marine mammals (detection, classification and location).

The originality of the configuration described above is therefore based on several characteristics:
- merging in the same module of the functions of positioning of the seismic streamers, optionally integrating therein the dynamic control of the streamers, and monitoring of marine mammals;
- merging of these same functionalities at the operator station, which affords maximum integration of these requirements called on to coexist and consequently optimum ergonomics for the operators of the geophysical prospection;
- great flexibility of deployment of the PAM function: the PAM modules are implicitly distributed all along the seismic streamers. In particular the supervision software can use the spatial diversity of the modules to allow optimization of the processing operations adapted to the location of marine mammals (PAM functionality).

Figure 11:
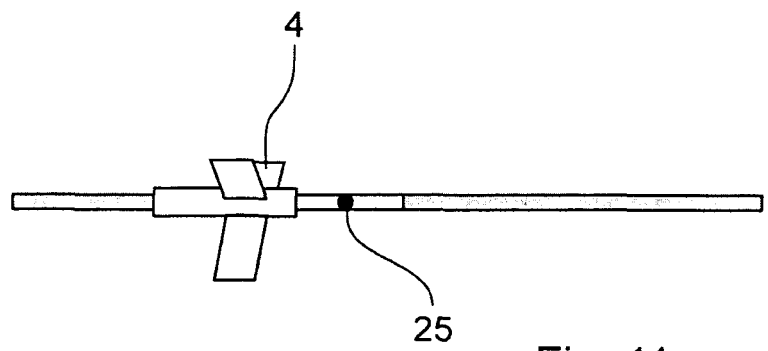

With reference to FIG. 11, the function of "acoustic repellent" for marine mammals can also be associated with the previously mentioned functions.

The module will then have a triple or even quadruple functionality:
- acoustic positioning of the marine seismic streamers;
- passive monitoring of marine mammals;
- the function of acoustic repellent of marine mammals;
- and possibly the function of dynamic control of the seismic streamers.

In this configuration, a single acoustic transducer 25 fulfils the three acoustic functions (in a similar fashion to the system in FIG. 8 described above).

In general terms, the acoustic emission of the artificial signals necessary for the acoustic repellent function can be achieved either by the transducer used for the acoustic positioning of the seismic streamers or by a transducer dedicated to this repellent function. Because of the size of the acoustics that can be integrated in the acoustic section, the acoustic repellent will be oriented at medium and high frequency (typically from 10 to 100 kHz) and will be rather intended to drive away pinnipeds and odontocetes.

It should be noted that the seismic source or sources can also be used as a low-frequency acoustic repellent (frequencies <10 kHz) for driving away large cetaceans. In this operating mode the emission power is controlled and the regulatory constraints concerning the mitigation methods (rise in power over time) are complied with.

In the versions of the system illustrated by FIGS. 9 to 11, which merge all the functionalities, the system software will supervise all the functions:

location and navigation of the seismic streamers;

passive monitoring of the marine mammals (detection, classification and location);

medium- and low-frequency acoustic repellent;

low-frequency acoustic repellent;

mitigation process.

From an operating point of view, the system deployed will be organised in different operating phases.

For example, a typical functioning could be:

after deployment of the network of streamers, and before the activation of the seismic sources: monitoring of the operating field in order to ensure that marine mammals are not present;

if marine mammals are present: implementation of the mitigation procedures, with possibly the use of medium- and/or high-frequency repellents (acoustic modules) and/or low frequency repellents (seismic sources);

if no marine mammals are present: seismic operating phase, with positioning of the streamers by the supervision software for the spatio-temporal synchronisation of seismic data. Throughout this seismic exploitation phase, the supervision system can assign modules in bioacoustic signal receiving mode (PAM detection function integrated at the acoustic module level);

if a bioacoustic signal is detected by a module, the information will be sent back to the supervisor, triggering the appropriate procedure:

confirmation of detection of marine mammal;

location of the bioacoustic source;

if there is a mammal in the nuisance zone, stoppage of seismic shootings;

monitoring of the movement of the mammal;

activation of the marine mammal classification procedures with possible use of repellents.

The seismic activities are resumed when the area is clear.

What is claimed is:

1. A system for acquiring seismic data in a marine environment, comprising:
   seismic streamers configured for being towed by a vessel using a seismic method, wherein said seismic streamers each include a plurality of sections having seismic sensors;
   means for detecting and/or locating marine mammals, wherein said marine mammal detection and/or location means are connected to an acoustic receiver for detecting vocalizations of the marine mammals, and wherein said marine mammal detection and/or location means are interposed between two sections of said seismic streamers;
   means for detecting positions of said streamers; and
   means for transmitting data to a master controller on board said vessel,
   wherein said marine mammal detection and/or location means include means for processing data from said acoustic receiver,
   wherein said data transmission means integrated in said seismic streamers are configured for transmitting to said master controller:
   data relating to said detection and/or location of marine mammals; and
   data relating to positions of said streamers.

2. The system according to claim 1, wherein said marine mammal detection and/or location means are associated with means for processing data issuing from said marine mammal detection and/or location means, said processing means being secured to said streamers.

3. The system according to claim 1, wherein said seismic streamers include electrical supply means, said marine mammal detection and/or location means being supplied by said seismic streamer electrical supply means.

4. The system according to claim 1, wherein said marine mammal detection and/or location means are integrated in modules comprising a section including first acoustic reception means dedicated to a marine mammal detection and/or location function and second acoustic reception means dedicated to a function of positioning said streamers in relation to each other, said first and second acoustic reception means being distinct.

5. The system according to claim 1, wherein said marine mammal detection and/or location means are integrated in modules comprising a section including acoustic reception means common to a marine mammal detection and/or location function and to a function of positioning said seismic streamers in relation to each other.

6. The system according to claim 1, wherein said marine mammal detection and/or location means include means for emitting acoustic signals deterring marine mammals.

7. The system according to claim 6, wherein said marine mammal detection and/or location means are integrated in modules comprising a section including first acoustic emission means dedicated to a function of deterring marine mammals and second acoustic emission means dedicated to a function of positioning said seismic streamers in relation to each other, said first and second acoustic emission means being distinct.

8. The system according to claim 6, wherein said marine mammal detection and/or location means are integrated in modules comprising a section including acoustic emission means common to a function of deterring marine mammals and a function of positioning said seismic streamers in relation to each other.

9. The system according to claim 1, comprising navigation control means coupled to said streamers in order to act at least on the immersed position of said streamers, said navigation control means being integrated in modules comprising said navigation control means.

10. A method of acquiring seismic data in a marine environment implementing a system according to claim 1, wherein seismic streamers are towed by a vessel for oil prospection using a seismic method, comprising a step in which a master controller on board said vessel dynamically configures each acoustic modules constituting the network in order to ensure an acoustic positioning of the seismic streamers and at least one of a detection of marine mammals and an acoustic repellent function.

11. The system of claim 1, wherein said data transmission means are configured for transmitting data communicated by seismic sensors to said master controller.

12. The system of claim 1, wherein the seismic sensors comprise hydrophones.

13. The system of claim 1, wherein the seismic sensors are configured for detecting and/or locating marine mammals.

14. The system of claim 1, wherein said seismic streamers comprise at least one acoustic transducer configured for acoustic detection of the seismic streamers' position or as an acoustic receiver for monitoring marine mammals.

15. A system for acquiring seismic data in a marine environment, comprising:
   seismic streamers configured to be towed by a vessel using a seismic method, wherein said seismic streamers include seismic sensors,
   means for detecting and/or locating marine mammals, wherein said marine mammal detection and/or location means are coupled to an acoustic receiver for detecting vocalizations of the marine mammals, means for detecting positions of said streamers, means for transmitting data to a master controller on board said vessel, wherein said marine mammal detection and/or location means are integrated in self-contained modules clamped outside said seismic streamers.

16. The system of claim 15, wherein the seismic sensors comprise hydrophones.

17. The system of claim 15, wherein the seismic sensors are configured for detecting and/or locating marine mammals.

18. The system of claim 15, wherein said seismic streamers include at least one coil allowing inductive coupling of said modules with said data transmission means integrated in said seismic streamers.

19. The system of claim 15, wherein said self-contained modules comprise self-contained electrical supply means.

20. A system for acquiring seismic data in a marine environment, comprising:

seismic streamers configured for being towed by a vessel, wherein said seismic streamers each comprise a plurality of sections having seismic sensors;

an electronic module configured to detect and/or locate marine mammals, wherein said electronic module is coupled to a transducer for detecting vocalizations of the marine mammals, and wherein said electronic module is interposed between two sections of said seismic streamers;

the transducer being configured to detect positions of said streamers; and telemetry wires for transmitting data to a master controller on board said vessel, wherein said telemetry wires integrated in said seismic streamers are configured for transmitting to said master controller:

data relating to said detection and/or location of marine mammals; and data relating to positions of said streamers.

* * * * *